United States Patent Office 3,519,861
Patented July 7, 1970

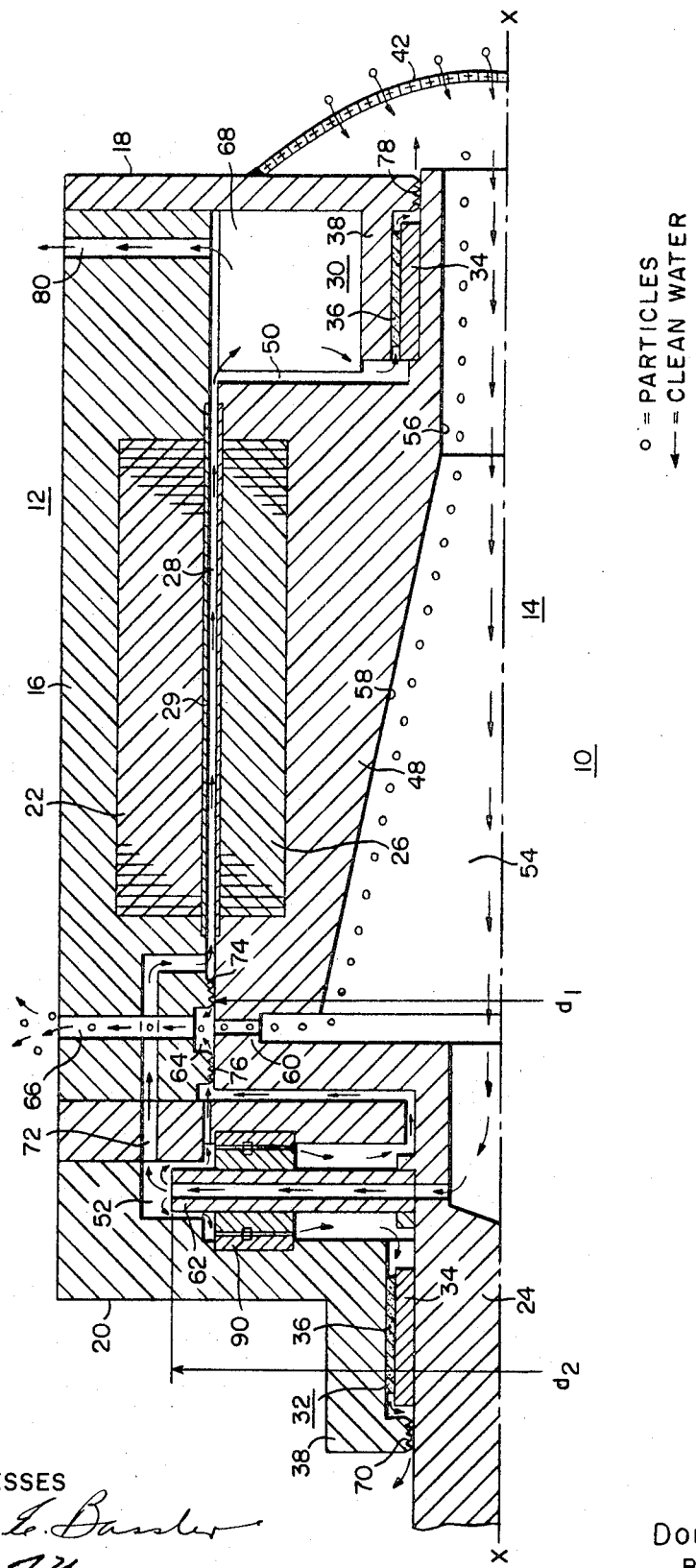

3,519,861
CLEANING AND COOLING SYSTEM FOR
CANNED MOTORS
Donald C. Guthan, Albany, N.Y., assignor to Westinghouse Electric Corporation, Pittsburgh, Pa., a corporation of Pennsylvania
Filed Mar. 17, 1969, Ser. No. 807,660
Int. Cl. H02k 5/12, 5/20, 9/26
U.S. Cl. 310—87                                10 Claims

ABSTRACT OF THE DISCLOSURE

A canned motor which may be used for pumping, or for propulsion of an underwater vessel operating submerged. Silt-laden water enters a hollow rotor shaft as a result of pumping action induced by impellers driven by the shaft. Centrifugal force causes the particle matter in the water, having a specific gravity greater than 1.0, to move to the outer periphery of the shaft bore while the clean water is confined to the center. The silt is discharged to the ambient water by a "low" head impeller and the clean water is circulated by a "high" head impeller through the shaft bearings and the gap between the rotor and the stator to lubricate the bearings and cool the motor.

BACKGROUND OF THE INVENTION

This invention relates generally, to canned motors and, more particularly, to a centrifugal separator and cooling system for a submerged canned motor.

Recent developments have indicated the need for canned motors operating submerged in a body of water and used for pumping, or for propulsion of underwater vessels. Because excess weight is a critical factor for such applications, it is desirable to utilize the ambient water to lubricate the motor bearings and to cool the motor, thereby eliminating the external heat exchanger and closed internal recirculation system utilized with prior motors. Prior systems are not suitable for direct adaptation to a submerged motor application because the heat exchanger presents a weight problem. Also, a secondary system to supply water at a high velocity to efficiently cool the motor is not readily available. However, the utilization of silt-laden water in the internal circulatory system of a motor could cause bearing damage and clogging of the system.

Accordingly, an object of this invention is to provide for separating particle matter from the ambient water in which a canned motor is submerged and utilizing the "clean" water to lubricate the motor bearings and cool the motor.

Another object of the invention is to provide for positive flushing of labyrinth seal areas in the motor.

Other objects of the invention will be explained fully hereinafter or will be apparent to those skilled in the art.

SUMMARY OF THE INVENTION

In accordance with one embodiment of the invention the rotor shaft of a canned motor, which is used to propel an underwater vessel, has a generally conical bore extending axially along the rotor with the apex of the cone near the bow of the vessel. A "low" head impeller and a "high" head impeller are located at the base of the conical bore. Shaft bearings are located in chambers in the stator. A generally convex screen is secured to the motor shell at the bow. During operation of the motor, silt-laden water flows through the screen and enters the bore in the rotor shaft as a result of the pumping action of the radial impellers. As the mixture travels along the shaft bore, centrifugal force causes the particle matter to move to the outer periphery of the bore while the clean water is confined to the center. The silt is discharged to the ambient water by the "low" head impeller and the clean water is circulated by the "high" head impeller through the bearings and the rotor-stator gap to lubricate the bearings and cool the motor. The water is then discharged from the motor area. Labyrinth seals on the shaft are also flushed by part of the clean water.

BRIEF DESCRIPTION OF THE DRAWING

For a better understanding of the nature and objects of the invention, reference may be had to the following detailed description, taken in conjunction with the accompanying drawing, in which the single figure is a diagrammatic view of a cleaning and cooling system for a canned motor embodying principal features of the invention.

DESCRIPTION OF THE PREFERRED EMBODIMENT

Referring to the drawing, there is shown a canned motor 10 which is constructed to operate submerged underwater and may be utilized to propel an underwater vessel (not shown). The motor 10 comprises a stator assembly 12 and a rotor assembly 14. The stator assembly 12 includes a housing 16 having detachable flanged end walls 18 and 20, and a plurality of stacked laminations 22 having stator windings (not shown) disposed in slots in the laminations 22 in the usual manner. The stator windings may be connected to a suitable source of electrical power to operate the motor.

The rotor assembly 14 includes a shaft 24 and laminations 26 having slots therein for receiving rotor windings (not shown) which may be of the squirrel-cage type. A rotor-stator gap 28 is provided between the stator and the rotor. In the present diagrammatic view, the thickness of the gap 28 is exaggerated.

In accordance with the usual practice in canned motor construction, the stator laminations and winding are protected by a cylindrical can 29 which is sealed in the stator housing. The stator can is composed of a relatively thin corrosion-resistant material, such as stainless steel. It may be secured in the stator housing in a manner well known in the art.

The rotor shaft 24 is rotatively mounted in axially spaced radial bearing assemblies 30 and 32. The bearing assembly 30 includes a bearing journal 34 secured to the shaft 24, a bearing sleeve 36 composed of a suitable material, such as graphite, and a bearing support 38 which may be formed integrally with the end wall 18. Likewise, the bearing assembly 32 includes a bearing journal 34, a bearing sleeve 36 and a bearing support 38 which may be formed integrally with the end wall 20.

As previously explained, the motor 10 may be utilized to drive an underwater vessel by means of a propeller (not shown) attached to the stern end of the shaft 24. A generally convex screen 42, or other suitable shield means, may be attached to the bow flanged end wall 18 in any suitable manner, as by welding. The screen 42 permits silt-laden water to enter the bore of the shaft and prevents large particles from entering the motor. A shield may be rotated by the shaft and spaced from the stator to function in a manner similar to the fixed screen.

As shown, the shaft 24 has an enlarged central portion 48 with a diameter greater than the diameter of the end portions of the shaft which are mounted in the spaced bearing assemblies 30 and 32 as previously described. The rotor laminations 26 and windings are disposed in the enlarged portion 48 of the shaft. The end wall 18 is spaced from the enlarged portion 48 to provide a chamber 50 which contains the shaft bearing assembly 30. The end wall 20 is spaced from the enlarged portion 48 to provide a chamber 52. Since the motor structure is symmetrical about the axial centerline X—X, only half of the structure is shown in the present drawing.

In order that the water in which the motor 10 is submerged may be utilized to lubricate the shaft bearings and to cool the motor without damaging the bearings and clogging the cooling system, provision is made for separating the particle matter from the silt-laden water and for circulating the clean water through the bearing assemblies 30 and 32, and the rotor-stator gap 28. As shown, the shaft 24 has an axial bore 54 beginning at the bow end of the shaft and terminating at an inner end between the spaced bearing assemblies 30 and 32. The bore 54 has a cylindrical portion 56 and a conical frustum portion 58 with the base of the cone being in the enlarged portion 48 of the shaft 24. A relatively low head radial impeller 60, defined by diameter, $d_1$, and a relatively high head radial impeller 62, incorporated in a thrust bearing assembly 90, defined by diameter $d_2$, are provided at the base of the cone. The bearing assembly 90 may be of the well known Kingsbury type. The impeller 60 discharges into an annular recess 64 in the stator housing 16 which, in turn, discharges through passages 66 into the ambient water in which the motor is submerged. The impeller 62 discharges into the chamber 52 within the stator assembly.

The method of operation is as follows:

Silt-laden water is drawn through the screen 42 and enters the cylindrical portion 56 of the shaft bore 54. The water is drawn into the shaft bore by the pumping action of the impellers 60 and 62 driven by the shaft 24. As the mixture travels along the conical portion 58 of the bore, the rotational action of the shaft and water causes the particle matter to move to the outer periphery of the bore as a result of centrifugal force, while the clean water is confined to the center of the bore. The silt or particle matter is discharged to the ambient water by the low head impeller 60 which discharges through the annular recess 64 and the passages 66 as previously explained. Because the radial impeller 62 has an outer diameter $d_2$ greater than the outer diameter $d_1$, the head developed by the impeller 62 is greater than the head developed by the impeller 60.

The clean water at the center of the shaft is pumped into the stern bearing chamber 52 by the impeller 62 and is circulated through the bearing assemblies 90 and 32 as shown by the arrows. Clean water is also forced through a labyrinth seal 70 on the shaft 24 to flush the seal.

Clean water also enters a recirculation tube 72 which connects the chamber 52 with one end of the motor gap 28. Because of the pressure differential between the impellers 60 and 62, the clean water also flushes labyrinth seal 74 and 76 disposed at opposite sides of the annular recess 64 in the stator housing 16.

The clean water enters the rotor-stator gap from the tube 72 and continues along the gap, thereby removing the motor heat, and enters the bearing chamber 50 at the bow end of the motor. The major percentage of the cooling water is then discharged from the motor area through a passage 80 to return to the environment. The remaining water is circulated through the bearing assembly 30 and labyrinth seal 78 and is discharged into the area between the stator flange 18 and the screen 42. Stagnating vanes 68 are provided in the chamber 50 to prevent pressure losses as the bearing water moves radially inward.

From the foregoing description, it is apparent that the centrifugal separator separates particle matter from the ambient fluid in which the motor is submerged to provide a clean lubricant for the bearings of the motor. The impeller pressure differentials provide positive flushing of the labyrinth seal areas in the motor to prevent clogging of the seals. The ambient fluid which is cleaned is utilized for cooling the motor, thereby eliminating the need for a heat exchanger.

Since numerous changes may be made in the above described construction and different embodiments of the invention may be made without departing from the spirit and scope thereof, it is intended that all subject matter contaned in the foregoing description or shown in the accompanying drawings shall be interpreted as illustrative and not in a limiting sense.

I claim as my invention:

1. In a cleaning and cooling system for a canned motor which operates submerged in silt-laden water, in combination, a stator assembly, a rotor assembly including a shaft rotatably mounted in the stator assembly with a gap between the rotor and the stator, spaced bearing means supporting the shaft, said shaft having an axial bore beginning at one end of the shaft and terminating at an inner end within the stator assembly, impeller means at the inner end of the bore driven by the shaft to draw silt-loaden water into the bore whereby centrifugal force causes the particle matter to move to the outer periphery of the bore thereby leaving clean water at the center of the bore, said stator having passages therein for discharging the particle matter, and said impeller means circulating the clean water through the bearing means and the rotor-stator gap.

2. The combination defined in claim 1, wherein the impeller means includes a relatively low head impeller and a relatively high head impeller.

3. The combination defined in claim 2, wherein the low head impeller discharges the particle matter through the passages in the stator and the high head impeller circulates the clean water through the bearing means and the rotor-stator gap.

4. The combination defined in claim 1, including shield means disposed at one end of the motor stator to permit silt-laden water to enter the bore of the shaft and prevent large particles from entering the motor.

5. The combination defined in claim 4, wherein the shield means is a generally convex screen attached to the stator assembly.

6. The combination defined in claim 2, including labyrinth seal means on the shaft, and wherein the high head impeller forces clean water through the seal means.

7. The combination defined in claim 1, wherein the central portion of the rotor shaft is enlarged with a greater diameter than the end portions mounted in the bearing means, and the stator assembly has end walls spaced from the enlarged central portion to provide chambers containing the bearing means.

8. The combination defined in claim 7, including fluid conducting means interconnecting one of said chambers with one end of the rotor-stator gap, and wherein the other end of the gap communicates with the other of said chambers.

9. The combination defined in claim 7, wherein the rotor bore is generally a conical frustum with the base of the cone being in the enlarged portion of the shaft.

10. The combination defined in claim 9, wherein the impeller means is at the base of the cone.

References Cited

UNITED STATES PATENTS

| | | | |
|---|---|---|---|
| 3,041,117 | 6/1962 | Ramsey | 310—88 X |
| 3,128,399 | 4/1964 | O'Reilly | 310—87 |
| 3,242,360 | 3/1966 | Carle | 310—87 |
| 3,267,868 | 8/1966 | Page | 103—87 |

WARREN E. RAY, Primary Examiner

U.S. Cl. X.R.

103—87, 111